Feb. 11, 1964  G. T. LYON  3,120,966
SHIELDED HOSE COUPLING AND ASSEMBLY
Filed Nov. 16, 1959  2 Sheets-Sheet 1

INVENTOR.
GILBERT T. LYON
BY
Burton & Parker
ATTORNEYS

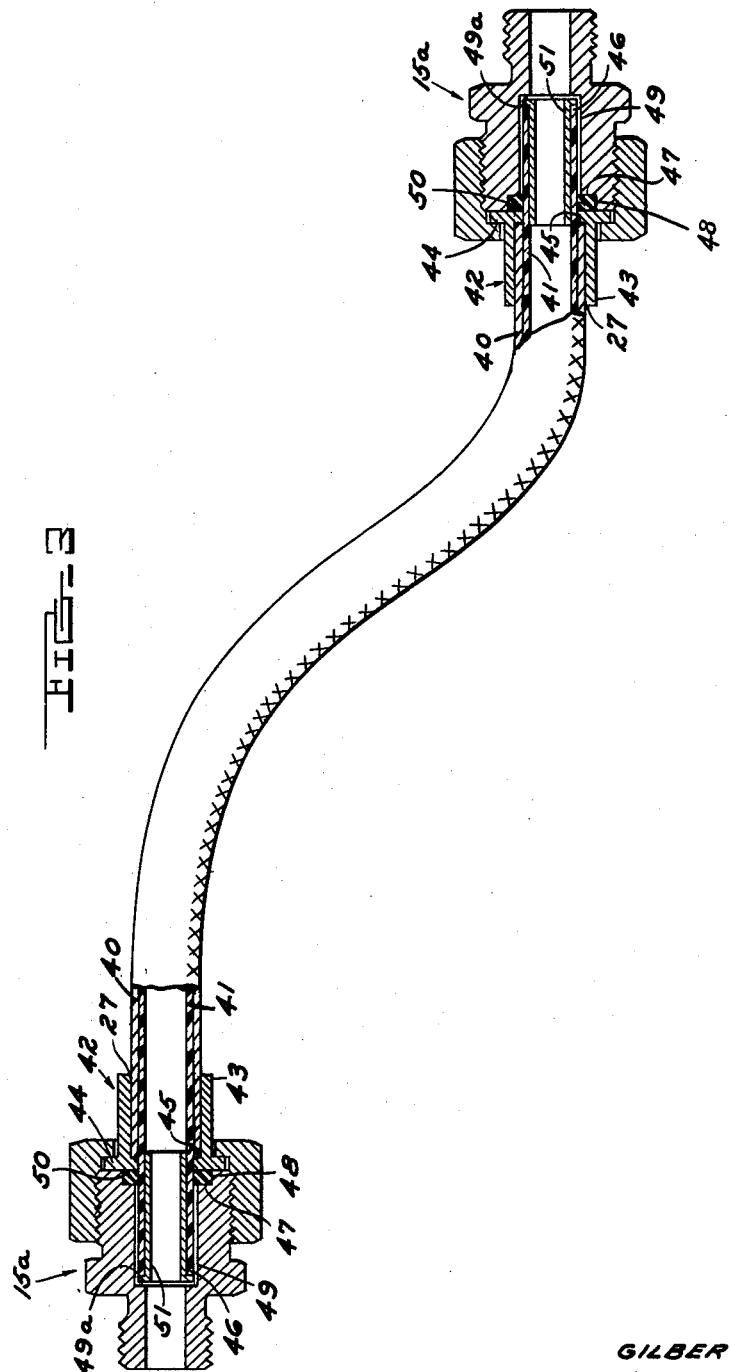

United States Patent Office 3,120,966
Patented Feb. 11, 1964

3,120,966
SHIELDED HOSE COUPLING AND ASSEMBLY
Gilbert T. Lyon, 2009 W. Houstonia Ave.,
Royal Oak, Mich.
Filed Nov. 16, 1959, Ser. No. 853,296
4 Claims. (Cl. 285—116)

My invention relates to re-usable fittings for hoses, and to a flexible tube or hose assembly. In one aspect my invention relates to a means for effecting a sound and leakproof connection of a hose of the type having an inner plastic core and an outer metal mesh jacket, and to the resultant fluid coupling device comprising the fitting and the hose.

The fitting of my invention is particularly useful in fluid pressure systems where pressures are in the 3000 p.s.i. range and where simple and effective leakproof replacement of hoses is required.

Sound and leakproof connection of reinforced hose has presented serious problems since the fittings available have involved somewhat complicated and delicate devices which must be installed with a great deal of care. The stainless steel mesh jacket which encases the plastic tube (Teflon) presented a problem in that it unravels when cut. Suitable lengths as stock parts could not, therefore, be satisfactorily stored. On installation, the workmen must cope with the problem and the result is often a function solely of his skill in handling this unraveling problem.

Fittings adapted to couple hose comprising a plastic inner tube and an outer mesh jacket or envelope which fittings are commercially available today allow the mesh jacket to unravel upon disconnecting the fitting from a sealed relation with the plastic tube and are difficult to reassemble upon the mesh jacket and tube. My improved fitting may be disassembled and the plastic tubing replaced and yet will prevent unraveling of the mesh and will allow ready reassembly of the fitting in sealed relation with the plastic tube, and in proper relation with the mesh jacket.

My invention overcomes these problems by rigidly connecting jacket adapters at proper locations along the length of the mesh jacket prior to or immediately after cutting the same to stock lengths. In this fashion, the unraveling problem is eliminated in one modification where the cuts are made after the adapters are joined to the jacket, and the unraveling problem is substantially reduced in the modification wherein the adapter is mounted immediately after the cut is made and before unraveling has progressed to any noticeable degree. Preferably, the adapter is silver solder to the jacket to provide a rugged bond therebetween capable of withstanding the forces encountered during assembly and use. Following insertion of the tube within the jacket, a reinforcing sleeve is inserted into the end of the tube to resist collapse upon tightening of a collar which draws the elements of the fitting into a rugged and leakproof condition.

It is therefore one object of my invention to provide a coupling for mesh jacketed plastic tubing where the jacket and tubing are axially separable, wherein the mesh jacket will not unravel upon disconnecting the coupling and wherein the jacket is rigidly held in the coupling against axial tension.

Another object of the invention is the provision of a fitting of the above character wherein a floating seal is provided allowing relative axial shifting between the fitting and the Teflon tube.

From another aspect the invention comprehends the provision of a hose assembly adapted to extend between a pair of devices between which fluid pressure communication is desired and wherein there may be relative shifting between such devices with the hose assembly comprising a length of wire mesh tubular jacket to each end of which is secured a portion of my above-mentioned improved fitting, which portion will prevent unraveling of the mesh. Also received upon the jacket between the aforementioned portions are other portions of the fittings, which latter portions are adapted to cooperate with the devices to which the hose is to be coupled. Removably received in the mesh jacket is a length of plastic tubing. Upon coupling the fittings to the devices with which a fluid-tight seal is desired, each fitting cooperates with the jacket and tubing to establish the seal. The fittings are so constructed that relative axial shifting between the jacket and the tubing as, for example, during relative shifting of the devices between which the hose assembly is coupled, is possible without disturbing the seal.

Other objects, advantages, and meritorious features will more fully appear from the specification, claims, and accompanying drawing, wherein:

FIG. 3 is a view of a hose assembly employing fittings of the character hereinbefore shown with the opposite end portions of the assembly shown in cross section.

Figure 1:
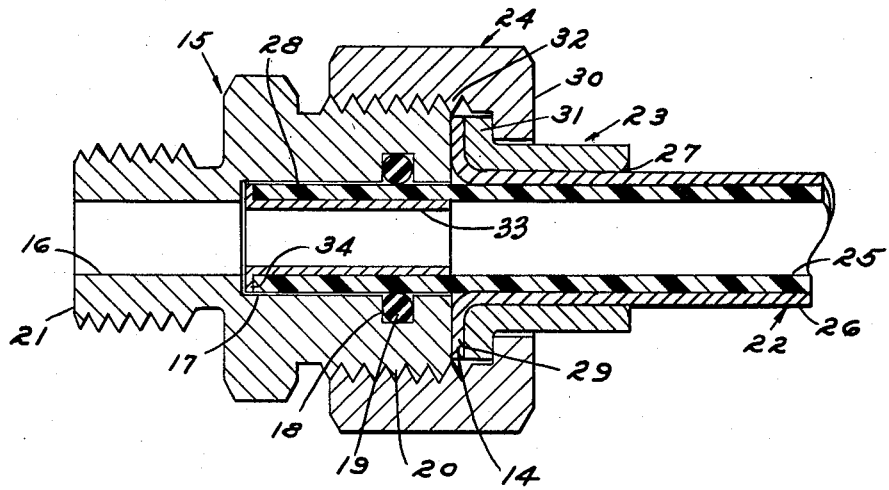
FIG. 1 is a cross sectional view showing one modification of my fitting with the hose and O-ring included therein.

Referring now to the modification shown in FIG. 1, it will be seen that the member 15 has a passage 16 therethrough, the passage at one end including a counterbore portion 17 in which is formed an annular groove 18 adapted to receive O-ring 19. The external surface at the counterbore end of member 15 includes external threads 20; the other end 21 is also threaded to enable connection to a fluid line or mechanism.

The member 15 provides the foundation or strength member to which a hose 22 is to be attached. The O-ring 19 is designed to cooperate with the hose to provide the leakproof seal. A jacket adapter 23 connected to the hose 22 and the collar 24 provides the means for attachment of the hose to the foundation member 15.

As seen in FIG. 1, the hose 22 includes an inner plastic tube 25, such as Teflon, encased in an outer stainless steel mesh jacket 26. The jacket adapter 23 is preferably rigdly bonded, as by silver solder 27 to the jacket 26. The portion 14 of the jacket 26 is flared outwardly into face-to-face engagement with the transversely disposed annular end surface 29 of the adapter 23. Preferably this flared-out end portion of the jacket is also silver soldered to the adapter 23.

The collar 24 includes means releasably connected to the adapter 23 for clamping the adapter and attached hose in proper position with the member 15. Preferably, the means on the collar 24 is a transverse inwardly extending flange 30 which abuts against a transverse outwardly extending flange 31 on the adapter. The collar 24 includes internal threads 32 which are threadedly engaged with the external threads 20 on member 15 to allow the drawing of the adapter and attached hose into sound leakproof engagement with the member 15 and O-ring 19.

The length of the tube portion 28 is predetermined to be slightly less than or conform with the depth of the counterbore portion 17 whereby a firm placement of the end portion 28 in the counterbore portion 17 is accomplished without the creation of an undue buckling bias. Preferably, a rigidifying and reinforcing sleeve 33 is inserted in the end of the tube 25 and extends therein a distance substantially equal to the length of the portion 28 and at least a reasonable distance beyond the O-ring 19 whereby the plastic tube portion 28 is reinforced. Preferably, the reinforcing sleeve 33 has an outwardly extending transverse lip 34 which is spaced slightly from the end of the counterbore portion 17 to allow for relative movement between the tubing and member 15.

Figure 2:
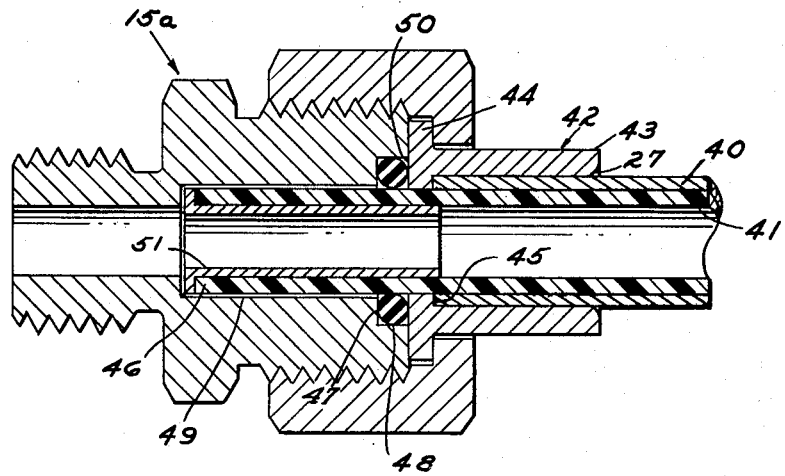
FIG. 2 is a cross sectional view showing a second modification of my fitting with a hose and O-ring included therein.

Referring now to FIG. 2, it will be seen that the parts involved are generally similar but that the jacket 40 about tube 41 is not flared. The adapter 42 has a cylindrical portion 43 and a transverse flange 44, the flange extending inwardly as lip 45 into a close fit with the tube portion 46 and completely encasing the end portion of the jacket 40. The adapter is silver soldered to the jacket. It will be noted also that a Teflon O-ring 47, or the like, is seated in a countersunk seat 48 formed in the outer end of the counterbore portion 49 and that the transversely disposed annular end surface 50 of the flange 44 on the adapter closes this countersunk seat 48 and aids in maintaining the O-ring in fluid sealing contact with the portion 46 of the tube. It will also be noticed that the reinforcing sleeve 51 extends through the tube end portion 46 beyond the O-ring 47 and substantially to the end of the jacket.

In FIG. 3 is shown a hose assembly comprising an outer metal mesh jacket 40 within which is disposed the flexible tubing 41, both of which have been heretofore mentioned in connection with FIGS. 1-3. Opposite ends of the assembly include fittings, or couplings, similar to the coupling shown in FIG. 2. In the assembly of FIG. 3, which may be used to establish fluid pressure communication between a pair of devices, the inner tubing 41 is allowed to shift axially relative to the metal jacket 40 and relative to the fittings at opposite ends of the assembly. This is particularly desirable where the devices between which the assembly is coupled shift relative to each other, such as, for example, in the coupling of fluid pressure lines in aircraft between fixed tubing elements secured to wing structures and portions of the aircraft engine which are flexibly mounted on the wing structure. Without provision for relative axial shifting between the inner tubing 41 and the end couplings and the outer mesh jacket 40, strains would be imposed on the inner tubing 41 which would tend to set up fracture thereof and result in failure. The ends of the tubing 41 are sufficiently spaced from the opposing face 49a so that upon insertion of the reinforcing sleeve 51, the end of the sleeve opposed to face 49a is slightly spaced therefrom. This will allow the tubing 41 to shift within the fitting toward and away from the face 49a. The sealing rings 47 which are compressed about the tubing 41 will allow relative axial shifting of the tubing relative to the rings without failure of the seal. This is particularly true where the tubing is formed of Teflon and the rings 47 are formed of Teflon. It is preferable that the rings be formed of a material compatible with the material of which the tubing is formed and which will allow a relative axial shift therebetween without failure of the fluid-tight seal.

It may be appreciated that if one were to grasp in each hand opposite ends of the assembly shown in FIG. 3 and flex the hose portion extending between the fittings, axial shifting would occur between the tubing and the mesh jacket 40 as well as some shifting between the tubing and the fitting and the floating seal provided within the fittings at opposite ends of the assembly will allow such shifting without tending to destroy either the tubing or the fluid-tight seals within the fittings.

I claim:
1. A fitting for a flexible shielded hose having an inner plastic tube and an external metal mesh jacket encasing the tube comprising: a fitting body member having a passageway therethrough provided with a counterbore for receiving in closely fitting relation a projecting end of the inner plastic tube, a jacket adapter member having a bore therethrough closely fitting over the end of the jacket of the hose adjacent the projecting end of the inner plastic tube and rigidly secured to the jacket, nut means releasably threadedly coupling said members together, a metal sleeve telescoped in said projecting end of the tube and terminating opposite the end of the jacket, said body member provided with an O-ring seat encircling the counterbore and disposed radially opposite the sleeve, an O-ring seal in said seat encircling in sealing engagement the projecting end of the inner plastic tube, one of said members provided with an integral barrier wall portion disposed between said O-ring and the jacket connected to the jacket adapter member and spacing the O-ring wholly out of contact with the jacket whereby the O-ring forms a seal with the projecting end of the inner plastic tube wholly independently of the jacket, said barrier wall portion having an annular radially extending face and the other member having a complementary axially opposed annular radially extending face, said faces being in opposition without said O-ring seal disposed therebetween and urged toward each other by said nut means to provide a solid non-resilient connection between such members.

2. The invention as defined in claim 1 characterized in that said barrier wall portion is integral with the body member and the jacket extends between and is gripped by said opposed annular radially extending faces.

3. The invention as defined in claim 1 characterized in that said barrier wall portion is integral with the jacket adapter member and said opposed annular radially extending faces are disposed in abutment with one another.

4. The invention as defined in claim 3 characterized in that said jacket adapter member is provided with a counterbore opening through that end thereof opposite the barrier wall portion and the jacket is received and bottomed within said counterbore and secured as by welding or the like in such counterbore.

References Cited in the file of this patent

UNITED STATES PATENTS

| | | |
|---|---|---|
| 1,054,244 | Rudolph | Feb. 25, 1913 |
| 1,368,919 | Fulton | Feb. 15, 1921 |
| 1,512,298 | Mueller | Oct. 21, 1924 |
| 1,651,022 | Fulton | Nov. 29, 1927 |
| 2,180,795 | Christensen | Nov. 21, 1939 |
| 2,394,632 | Parker | Feb. 12, 1946 |
| 2,701,871 | Rauch | Feb. 8, 1955 |
| 2,768,010 | Bird | Oct. 23, 1956 |
| 2,809,056 | Kaiser | Oct. 8, 1957 |
| 2,933,333 | Bredtschneider | Apr. 19, 1960 |
| 2,935,343 | Ellis | May 3, 1960 |
| 3,008,736 | Samiran | Nov. 14, 1961 |